Dec. 6, 1960   L. J. VARNERIN, JR., ET AL   2,963,601
IONIZATION VACUUM GAUGE
Filed Aug. 7, 1957

WITNESSES
Edwin E. Bassler
Robert C. Baird

INVENTORS
Lawrence J. Varnerin, Jr.
& George J. Schulz
BY Homer O. Blair
ATTORNEY

# United States Patent Office 2,963,601
Patented Dec. 6, 1960

2,963,601

IONIZATION VACUUM GAUGE

Lawrence J. Varnerin, Jr., Summit, N.J., and George J. Schulz, Wilkins Township, Allegheny County, Pa., assignors to Westinghouse Electric Corporation, East Pittsburgh, Pa., a corporation of Pennsylvania Filed Aug. 7, 1957, Ser. No. 676,871

6 Claims. (Cl. 313—7)

This invention relates to ionization vacuum gauges and, more particularly, to ionization vacuum gauges that are particularly suitable for use in measuring pressures in the range from $10^{-3}$ mm. Hg to 10 mm. Hg.

The ease of use and simple construction of ionization gauges has led to their extensive application to the measurement of gas pressures in the range below about $10^{-3}$ mm. Hg. In recent years the usefulness of the ionization gauge has been greatly increased by the development of the Bayard-Alpert ionization vacuum gauge (U.S. Patent 2,605,431, R. T. Bayard) which allows accurate measurements to be made at pressures at least two orders of magnitude lower than was possible with conventional ionization gauges. However, the pressure range from $10^{-3}$ mm. Hg to 10 mm. Hg has long been a very difficult one in which to make pressure measurements. Yet, this is a very important range commercially and experimentally. Much vacuum processing is done in this range and many gas-filled tubes are filled to pressures in this range. In most cases the conventional ionization gauge can be used up to pressures of $10^{-3}$ mm. Hg with accuracy because the curve of the ion current vs. pressure is linear to this range. Also, with proper calibration and sacrificing strict linearity, the ionization gauge can be used up to pressures of $10^{-2}$ mm. Hg. The deviation from linearity in the pressure range from $10^{-3}$ to $10^{-2}$ mm. Hg is of the order of 20% and above these pressures the ionization gauge cannot satisfactorily be used.

No single pressure measuring device covers the pressure range from $10^{-3}$ mm. Hg to 10 mm. Hg adequately. Also, the various gauges that are used in portions of this range have certain disadvantages. For example, the McLeod gauge is bulky, fragile, difficult to calibrate, difficult to construct, supplies only intermittent readings and serves as a source of mercury contamination. Another type of gauge used in this region is the Philips gauge. However, because of the use of a magnet to control the motion of the electrons, the Philips gauge is difficult to construct and cannot be baked out and outgassed at high temperatures in order to remove accumulated impurities. In addition, the Philips gauge produces a signal which is not a linear function of pressure. Alphatron gauges can be used but they have the disadvantage that radioactive material must be introduced into the vacuum system and they are also difficult to use. Molecular gauges have been used but they involve the use of vacuum rotating joints with the attendant use of greases which results in vacuum contamination. Pirani gauges and thermocouple pressure gauges can be used but they cover only a limited range with accuracy, have a non-linear relationship between output signal and pressure and have poor stability.

We have found that the difficulties in the use of the ionization gauge at pressures above $10^{-3}$ mm. of mercury are attributable to a number of factors. First the electron paths in the ionization gauge vary with pressure, that is, as the pressure increases the electrons are involved with increasing numbers of collisions which result in pressure dependent paths. This leads to gauge non-linearity and makes the ionization gauge useless about $10^{-2}$ mm. Hg. Another factor is that the collection efficiency for positive ions is pressure dependent, that is, in the higher pressure range the ions being collected become involved in collisions with gas atoms which change the ion path and consequently the probability of collection. This is a second source of non-linearity. In addition, ionization gauges have one further disadvantage for pressure measuring purposes in that when ions are collected on solid surfaces many of the neutralized atoms are trapped, resulting in a loss of gas. This is known as electrical cleanup or ionic pumping which may be advantageous in attaining extremely low pressures but is often undesirable during accurate pressure measurements. Also, this trapped gas is reevolved slowly at later times and is a source of contamination when the gauge is used with another gas.

Our invention relates to a novel ionization gauge which extends the high pressure linear limit by orders of magnitude and in addition minimizes considerably the electrical cleanup problem.

Therefore it is an object of our invention to provide an improved ionization vacuum gauge.

It is another object of our invention to provide an improved ionization vacuum gauge which is particularly suitable for use in measuring pressures from $10^{-3}$ mm. Hg to 10 mm. Hg.

It s a further object to provide an improved ionization gauge which minimizes the electrical cleanup problem.

These and other objects of our invention will be apparent from the following description taken in accordance with the accompanying drawing throughout which like reference characters indicate like parts, which drawing forms a part of this application and in which.

Figure 1:
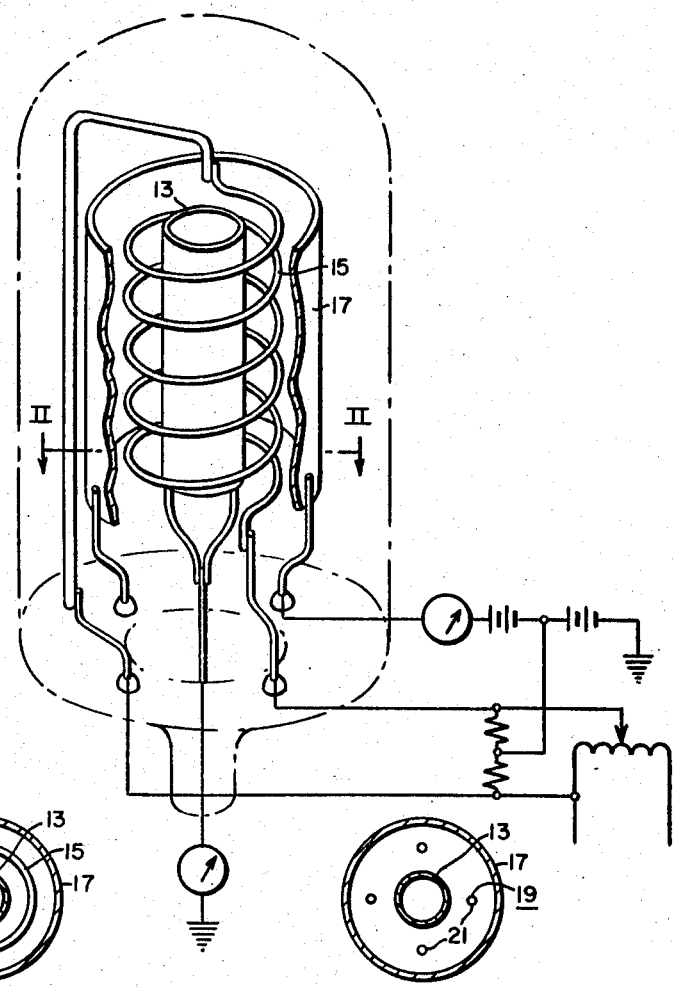
Figure 1 is a perspective view partially broken away of an ionization vacuum gauge constructed in accordance with one embodiment of our invention.
Figure 2:
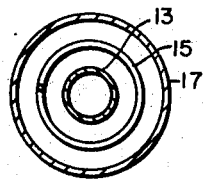
Fig. 2 is a top sectional view taken along the lines II—II of Fig. 1.

In Figs. 1 and 2 there is shown an ionization vacuum gauge in accordance with one embodiment of our invention in which an ion collector 13 is surrounded by an electron emitter 15 which in turn is surrounded by an electron collector 17. The above electrode structure is enclosed in an envelope 11 made of a suitable material such as glass. In this particular embodiment the ion collector is in the form of a cylindrical sleeve and, if desired, may be made of a high work function material such as platinum in order to minimize thermionic emission which may result from heating by the electron emitter 15.

Also, in some embodiments it may be desirable to utilize a solid cylindrical post as an ion collector 13. In any event, the ion collector 13 must have a diameter which is a large fraction (25% to 90%) of the diameter of the electron emitter 15 in order that high enough fields be established near the electron emitter 15 to draw the ions formed past the electron emitter 15 as discussed below.

In this particular embodiment the electron emitter 15 is in the form of a helical filament which may be made of a material such as tungsten. The electron collector 17, which in this embodiment is in the form of a cylindrical sleeve, may be made of a suitable material such as molybdenum.

The potential applied to the electrodes will depend upon the spacing of the electrodes, but considerable latitude is possible. For example, one arrangement we have found to be suitable is the use of a cylindrical ion collector 13 approximately one inch in length and 1/3 inch in diameter surrounded by a helical tungsten filament about 1/2 inch in diameter and in turn surrounded by a cylindrical electron collector 17 which is about 3/4 inch in diameter. In this particular case the vacuum gauge operates satisfactorily when the ion collector 13 is maintained at ground potential with the electron emitter 15 being maintained at +120 volts and the electron collector 17 being maintained at +180 volts. Thus the potential between the electron emitter 15 and the electron collector 17 is approximately 60 volts and the ion collector 13 is about 120 volts negative with respect to the electron emitter 15. The electron collector 17 may vary between 3/16 inch and 1½ inches, with the spacing of the other elements varying accordingly. Thus the spacing between the ion collector 13 and the electron emitter 15 could vary between about 0.05 inch and 0.33 inch and the spacing between the electron emitter 15 and the electron collector 17 could vary between about 0.06 inch and 0.5 inch.

In operation electrons are emitted by the electron emitter 15 and are accelerated toward the electron collector 17. However, before the electrons are collected by the electron collector a certain number of them will form positive ions by collision with gas atoms. These positive ions are then accelerated toward the electron emitter 15 but as the electron emitter 15 has a comparatively small area and as the field from the ion collector 13 penetrates the structure of the electron emitter 15, a certain fraction of the positive ions are collected at the ion collector 13. The ion current due to the collection of these ions is a measure of the pressure of the gas present. Therefore, the ion collector 13 must have a comparatively large diameter in order that high enough fields may be established near the electron emitter 15 to draw the positive ions past the electron emitter 15. If this were not the case, a large portion of the positive ions would be collected by the electron emitter and the gauge would not be linear.

One feature of the construction of our gauge which allows it to be used at comparatively high pressures is that the electron path must be short and well defined. Therefore, elastic collisions cannot change the electron path appreciably but only change the energy of the electrons. Since the average energy lost per collision is small and the path is short in length, non-linear effects become important only at comparatively high pressures. Also, the electron paths must be short compared to the mean free path for ionization. As the two electrons resulting from an ionizing collision have energy lower than those of the primary electrons and therefore their ionization probability is changed, this change in ionization probability would lead to non-linearities in the use of the vacuum gauge if the paths of the electron were not short compared to the mean free path for ionization.

Another reason for having a short electron path is that the electron collector 17 collects not only the primary electrons emitted by the emitter 15 but also the additional electrons resulting from the ionization process. When these additional electrons become a significant fraction of the primary electrons, non-linearities again result. The above-mentioned electron collection process causes saturation of the ion current at relatively high pressures and limits the ratio of ion current to electron current to unity if no other limiting mechanisms are present. Therefore, a gauge having a short electron path can be used to higher pressures.

Another advantage of the structure of our gauge is the fact that the ion collection path is short and ion losses to the ends of the tube structure caused by collisions is minimized. In addition, our structure has another advantage in that the ion collector 13 is very hot as a result of heating by the electron emitter 15. Therefore, the positive ions are collected largely by the very hot metallic surfaces of the ion collector 13. However, ions can be trapped (that is, retained) only with great difficulty on very hot surfaces. Therefore, electrical cleanup or ionic pumping problems are greatly minimized.

Another advantage of the structure of our tube is the fact that comparatively few ions formed are collected on the walls or the envelope 11 of the vacuum gauge. In certain other ionization gauges a large fraction of the ions formed are collected on the walls of the tube which is undesirable when accurate pressure measurements are to be made. While this gauge is particularly useful in the pressure range of $10^{-3}$ mm. of mercury to 10 mm. of mercury, it also may be used in the range of the conventional ion gauge if desired.

Figure 3:
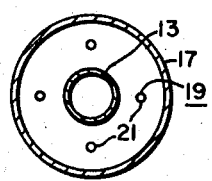
Fig. 3 is a top sectional view of an ionization vacuum gauge in accordance with another embodiment of our invention.

The collection efficiency of the ion collector 13 should be maintained independent of pressure. However, the probability that an ion is collected by the electron emitter 15 in its path increases as the pressure increases. In order to keep the ion collection efficiency independent of pressure, it is desirable that the electron emitter 15 use structures in which essentially all of the ions are collected by the ion collector 13 at all pressures. As can be seen in Figs. 1 and 2, the electron emitter 15 occupies comparatively little space due to its filamentary structure. Another suitable electron emitter structure is shown in Fig. 3 in which the electron emitter 19 is made of a number (for example, two or four) of vertical filamentary electron emitters 21. In Fig. 3, the ion collector 13 and the electron collector 17 are similar to those shown in Figs. 1 and 2. The structure of the electron emitter 19 shown in Fig. 3 also occupies a very small area but may have certain advantages because the filaments 21 may be more ruggedly supported than the helical structure shown in Figs. 1 and 2.

Figure 4:
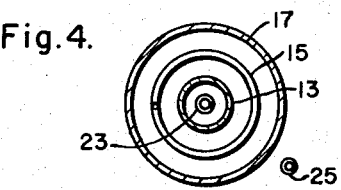
Fig. 4 is a top sectional view of an ionization vacuum gauge in accordance with another embodiment of our invention.

Another embodiment of our invention is shown in Fig. 4 in which a metal ion collector heater 23 is positioned inside the ion collector 13 and a metal electron collector heater 25 is positioned outside the electron collector 17. These heaters 23, 25 are used to degas the electron collector 17 and the ion collector 13 during manufacture and between various operations if necessary. The ion collector heater 23 and the electron collector heater 25 may be made of any suitable material such as tungsten. In this particular embodiment the ion collector heater 23 and the electron collector heater 25 are small helical filaments but of course other forms may be used. In Fig. 4 as in Figs. 2 and 3, the envelope 11 is omitted for simplicity of illustration.

One advantage of the vacuum gauge disclosed in our invention is that it does not exhibit a change in sensitivity at the comparatively high pressures from $10^{-3}$ mm. Hg to 10 mm. Hg. This desirable feature is the result of the previously mentioned high collection efficiency of the ion collector 13 which collects virtually all of the ions produced in the gauge.

As discussed previously, the actual potentials used may be varied to a certain extent but the potential of the electron emitter 15 must be positive with respect to the potential of the ion collector 13 and negative with respect to the potential of the electron collector 17.

While the present invention has been shown in a few forms only, it will be obvious to those skilled in the art that it is not so limited but is susceptible of various changes and modifications without departing from the spirit and scope thereof.

We claim as our invention:

1. An ionization low pressure gauge comprising an envelope, a cylindrical ion collector, a coaxial helical filamentary electron emitter surrounding said ion collector and a coaxial tubular cylindrical electron collector surrounding said electron emitter, said ion collector having cross sectional dimensions which are a large fraction of the diameter of said helical electron emitter, connections adapted to supply a potential to said electron emitter which is positive with respect to the potential of said ion collector and negative with respect to the potential of said electron collector.

2. An ionization pressure gauge comprising an envelope, a cylindrical ion collector, a coaxial helical filamentary electron emitter surrounding said ion collector and a coaxial tubular cylindrical electron collector surrounding said electron emitter, said ion collector having a diameter about 2/5 that of said electron collector and said electron emitter having a diameter about 2/3 that of said electron collector.

3. An ionization low pressure gauge comprising an envelope, a cylindrical ion collector, a coaxial helical filamentary electron emitter surrounding said ion collector and a coaxial tubular cylindrical electron collector surrounding said electron emitter, said electron collector having a diameter between 3/16 inch and 1½ inches, said ion collector having a diameter about 2/5 that of said electron collector and said electron emitter having a diameter about 2/3 of that of said electron collector.

4. An ionization pressure gauge comprising an envelope, a cylindrical ion collector, a filamentary electron emitter disposed externally to said cylindrical ion collector and a tubular, cylindrical electron collector surrounding said filamentary electron emitter and disposed coaxially with said cylindrical ion collector, said cylindrical ion collector having a radial dimension which is a large fraction of the radial distance perpendicularly from the center axis of said cylindrical ion collector to said filamentary electron emitter, means to supply a potential to said filamentary electron emitter which is positive with respect to the potential of said cylindrical ion collector and negative with respect to the potential of said tubular, cylindrical electron collector.

5. An ionization pressure gauge comprising an envelope, a cylindrical ion collector, one or more filamentary electron emitters disposed externally to said cylindrical ion collector and a tubular cylindrical electron collector surrounding said filamentary electron emitters and disposed coaxially with said cylindrical ion collector, said cylindrical ion collector having a radial dimension which is about two-fifths of the radius of said tubular, cylindrical electron collector, the radial distance perpendicularly from the center axis of said cylindrical ion collector to any of said filamentary electron emitters being about two-thirds of the radius of said tubular, cylindrical electron collector.

6. An ionization pressure gauge comprising: an envelope; a cylindrical ion collector; one or more filamentary electron emitters disposed externally to and uniformly spaced from said cylindrical ion collector; a tubular, cylindrical electron collector surrounding said filamentary electron emitters and disposed coaxially with said cylindrical ion collector; said tubular, cylindrical electron collector having a radius between three thirty-seconds inch and three-quarters inches; said filamentary electron emitters disposed a radial distance perpendicularly from the center axis of said cylindrical ion collector which is about two-thirds of the radius of said tubular, cylindrical electron collector; said cylindrical ion collector having a radius which is about two-fifths of the radius of said tubular, cylindrical electron collector.

References Cited in the file of this patent
UNITED STATES PATENTS

| Number | Name | Date |
|---|---|---|
| 2,043,517 | Pratt | June 9, 1936 |
| 2,061,255 | Rockwood | Nov. 17, 1936 |
| 2,507,696 | Depp | May 16, 1950 |
| 2,573,005 | Glyptis | Oct. 30, 1951 |
| 2,605,431 | Bayard | July 29, 1952 |
| 2,742,588 | Hollenberg | Apr. 17, 1956 |
| 2,790,949 | Ottinger et al. | Apr. 30, 1957 |
| 2,793,314 | White | May 21, 1957 |

OTHER REFERENCES

An Ionization Gauge of Simple Construction by C. M. Fogel, Proceedings of the I.R.E. and Waves and Electrons, May 1946, pages 302 to 305.